C. Mellinger.
Furnace.
No 3107 Reissued Sept. 1, 1868.
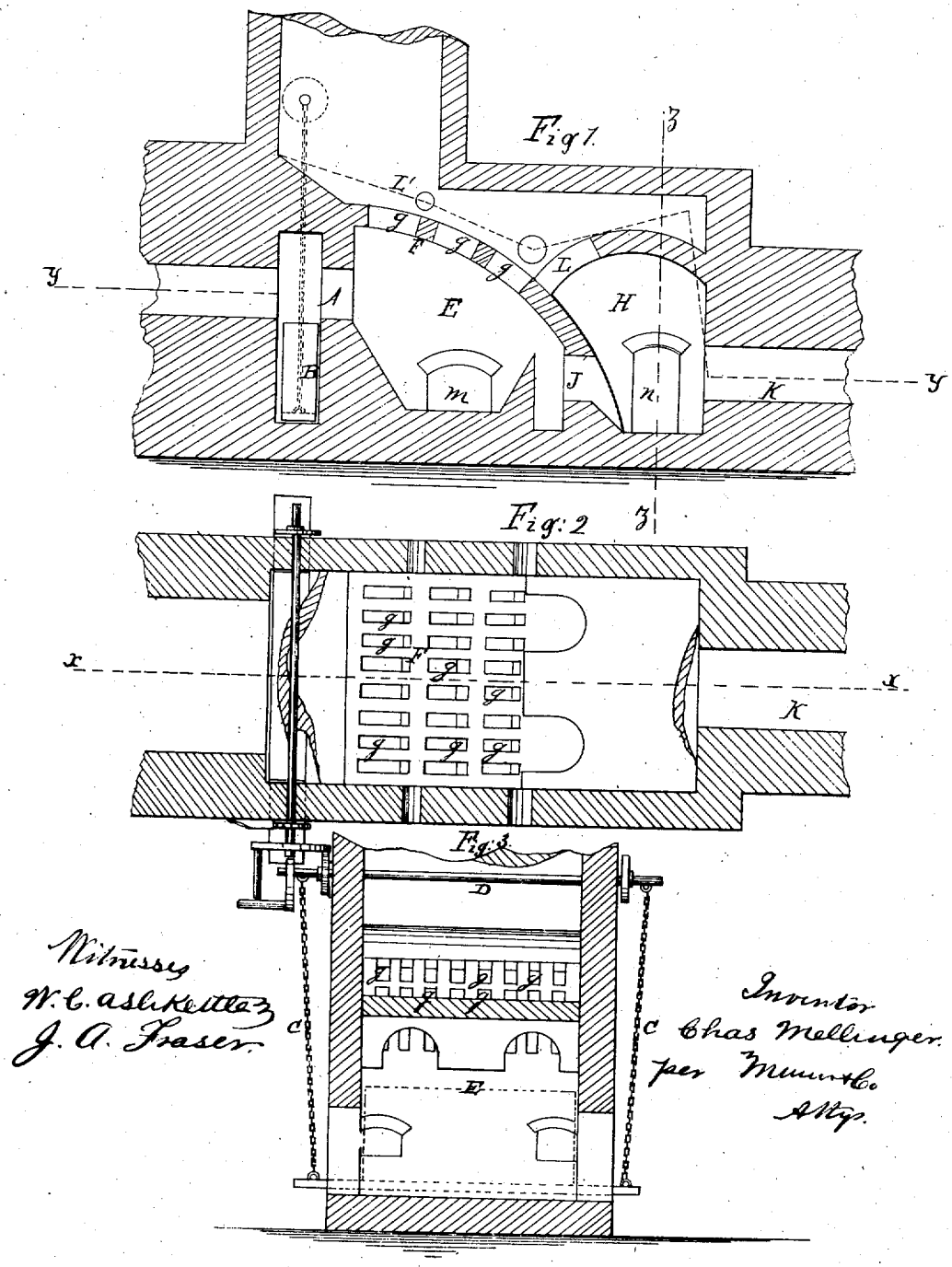

United States Patent Office.

CHARLES MELLINGER, OF CORNWALL, PENNSYLVANIA.

*Letters Patent No.* 78,113, *dated May* 19, 1868; *reissue No.* 3,107, *dated September* 1, 1868.

IMPROVED FURNACE FOR ROASTING ORES.

The Schedule referred to in these Letters Patent and making part of the same.

TO ALL WHOM IT MAY CONCERN:

Be it known that I, CHARLES MELLINGER, of Cornwall, in the county of Lebanon, and State of Pennsylvania, have invented a new and useful Improvement in Blast-Furnaces; and I do hereby declare that the following is a full, clear, and exact description thereof, which will enable those skilled in the art to make and use the same, reference being had to the accompanying drawings forming part of this specification, in which—

The invention relates to improvements in the method of manufacturing pig-iron, but having more particular reference to preparing or desulphurizing the ore before it is introduced into the blast-furnace.

And the invention consists in the construction and general arrangement of an oven or furnace, the use of which enables me to utilize the heat and gaseous products of combustion, which escape from the blast-furnace in the operation of smelting, thereby desulphurizing, preparing, or roasting the ore, preparatory to smelting, as will be hereinafter more fully described.

Figure 1 represents a vertical section of the oven, through the line *x x* of fig. 2.

Figure 2 is a section of fig. 1, through the line *y y*.

Figure 3 is a verti al section of fig. 1, on the line *z z*.

Similar letters of reference indicate corresponding parts.

The heat and gases from the blast-furnace enter the oven through the aperture A, which aperture A is opened or closed, in whole or in part, and the current of heated gases regulated by a sliding door or damper, B, which is operated by chains, C, and windlass-shaft, D, as seen more distinctly in fig. 3.

The heated gases are discharged into the chamber E.

F is an arch over the chamber E, with apertures through it, as seen at *g*.

On this arch the ore to be desulphurized or prepared is first placed.

The perforated arch allows the heat to act freely upon the ore thus placed, where it is subjected to a high temperature before it is discharged into the roasting-chambers.

The heated gases pass from the chamber E into the chamber H through the aperture J, and from thence out through the aperture K.

In the use of the ore called sulphuret of iron, great difficulty is experienced in reducing it in the blast-furnace without some preparatory process, which generally is a method known as "pile-roasting."

This process of roasting or desulphurizing involves unnecessary expense, while there is so great a discharge of heat from the top of the furnace.

Besides, the result of such roasting is very imperfect and unsatisfactory.

I therefore propose to avoid both the expense and the above-mentioned imperfect roasting, by utilizing the heated gases or surplus heat, which escapes at or near the top of the blast-furnaces.

As before stated, the heat from the blast-furnace is introduced into the chamber E through the aperture A.

The ore is placed, in the first instance, upon the grated arch F, it being introduced through proper apertures in the wall from above.

The space above the arch, marked L′, is kept filled with ore.

The finer particles will pass through the arch into the chamber E, from which they may be removed after they have become sufficiently heated, and before they have become vitrified or injured, which finer particles of ore are replaced with fresh ore from above.

This removal is accomplished through properly-constructed working-apertures in the wall, with bars suitably constructed for the purpose.

The larger pieces or lumps of ore will pass over the grated arch, being subjected to the action of the heat at the same time, and pass into the chamber H through the aperture L, where they are subjected to the action of the heat as desired.

*m* and *n* indicate the "working"-doors.

The arrangement and operation of the suspended damper B enable me to control and regulate the heat with great exactness.

It is necessary to control the heat in the ovens or chambers during the operation of roasting, to prevent injury to the ore.

For this purpose, the damper should be so arranged that it can be readily adjusted according to the intensity of the heat and the condition of the ore.

Having thus described my invention, I claim as new, and desire to secure by Letters Patent—

1. In combination with a desulphurizing-furnace or oven for preparing iron ore for smelting, the sliding door or damper B, arranged and operated substantially as described.

2. In combination with a desulphurizing-furnace, for the purposes mentioned, the grated or perforated arch F, substantially as described.

3. The combination of the arch F, the chambers E and H, the apertures J and L, and the damper B, substantially as and for the purposes described.

4. A blast-furnace, so constructed that the surplus heat or gas escaping from the same is utilized, thereby desulphurizing, preparing, or roasting the ore, preparatory to smelting, substantially as herein set forth.

In testimony that I claim the foregoing, I have hereunto set my hand, this 16th day of July, 1868.

CHARLES MELLINGER.

Witnesses:

JAMES McGINNESS,

SAM'L EVANS.